(No Model.)
E. WESTON.
ELECTRICAL MEASURING INSTRUMENT.
No. 490,760. Patented Jan. 31, 1893.
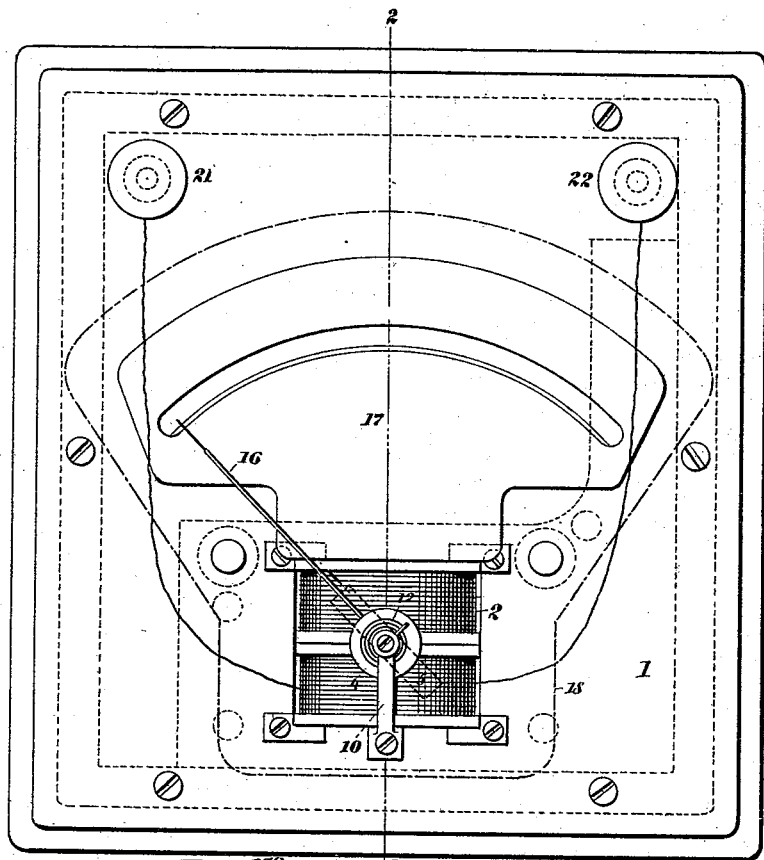
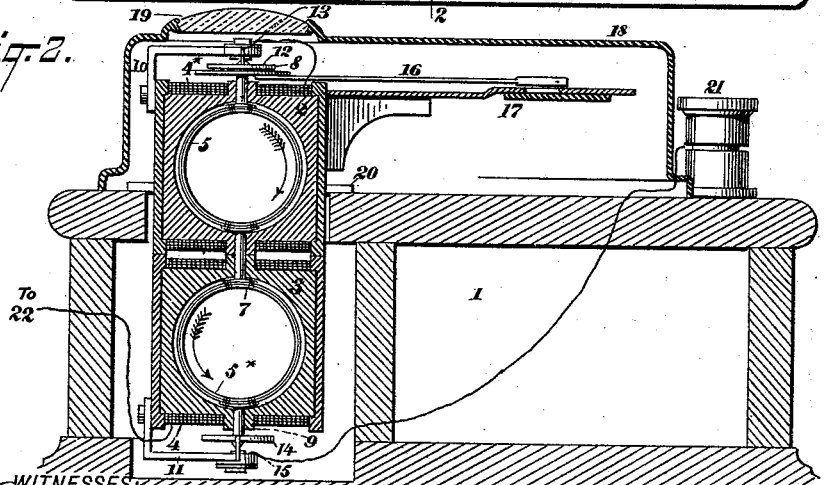

UNITED STATES PATENT OFFICE.

EDWARD WESTON, OF NEWARK, NEW JERSEY.

ELECTRICAL MEASURING-INSTRUMENT.

SPECIFICATION forming part of Letters Patent No. 490,760, dated January 31, 1893.

Application filed October 3, 1892. Serial No. 447,679. (No model.)

*To all whom it may concern:*

Be it known that I, EDWARD WESTON, of Newark, Essex county, New Jersey, have invented a new and useful Improvement in Electrical Measuring-Instruments, of which the following is a specification.

In Re-issue Letters Patent No. 11,250, granted to me June 28, 1892, I have fully described and claimed an electrical measuring instrument intended more particularly for the measurement of alternating currents of electricity. The particular form of instrument therein shown and described contains a stationary coil, a second coil arranged within said stationary coil and vibrating on pivots, springs which oppose and counterbalance the impressed action of the movable coil, and an index-needle which is carried by said movable coil and which moves over a suitably-marked scale. The moving coil is controlled by two reacting variable fields; namely, the varying field about the moving coil reacting upon the varying field about the fixed coil; and as the moving coil is balanced against the exceedingly delicate coiled springs, the index needle controlled by this coil moves at once to a new position dependent upon the difference of potential between the instrument terminals.

In the instrument described in my re-issued Letters Patent aforesaid, it is obvious that terrestrial magnetism must to a limited extent affect the scale-readings unless the instrument be properly disposed with reference to the magnetic meridian. While this, as a rule, can be easily done, there are sometimes cases when it is desirable that the instrument should remain in some definite or fixed position; or when, for any other reasons the instrument should be rendered astatic.

My present invention consists in a new construction of the aforesaid instrument whereby it is made astatic and the effects of terrestrial magnetism eliminated. The said construction, briefly described, consists in combining together two fixed coils and two moving coils, each moving coil vibrating in the field of force of its corresponding fixed coil, but both of said moving coils being supported and vibrating upon the same pivot shaft. The moving coils are wound in opposite directions, and they are disposed on the shaft relatively one over the other; the fixed coils being relatively placed in the same relation.

In the accompanying drawings, Figure 1 is a plan view of the instrument constructed as described and Fig. 2 is a sectional view on the line $u, u,$ of Fig. 1.

As the general construction of the instrument is, in many respects, the same as that set forth in my re-issue patent aforesaid, I will describe it in as brief terms as possible.

1 is the base of the instrument, which is here made in the form of a box and is provided with an opening in which are disposed the spools 2, 3 upon which the fixed coils 4 and 4* are wound. The bodies of the spools 2 and 3 are made of rubber or other insulating material, and may be hollowed out so as to form an interior spherical cavity. 5 and 5* are the movable coils disposed relatively within the cavities of spools 2 and 3. These coils are preferably made of fine, insulated wire, the several turns of which are cemented together so that each coil is practically a solid ring. The two coils 5 and 5* are wound in opposite directions, as indicated by the arrows, and they are connected by a short shaft, 7, which is made preferably of aluminium and which extends through an opening between the bodies of the two spools 2 and 3. Diametrically opposite the short shaft 7 and to the coils 5 and 5* respectively, are connected short shafts 8 and 9 likewise of aluminium, which are pivoted in suitable step-bearings in the brackets 10 and 11. The shaft 8 carries a spiral spring, 12, one end of which is connected to said shaft 8 and the other end to a pivoted arm, 13, which is suported on the bracket 10. A similar spring, 14, has one end fastened to the shaft 9 and the other end to an arm, 15, which is supported on the bracket 11. The construction of these springs and their object and purpose is the same as is fully set forth in my re-issue above referred to, and therefore need not here be detailed, By turning the arms 13 and 15, the springs are adjusted so as to offer more or less opposition to the impressed movements of the coils. Also supported on shaft 8 is an index-needle, 16, which extends over a scale, 17. 18 is the inclosing case of the instrument having an opening inclosed with a piece of glass, 19, through which the works can be seen. The working parts of the instrument are supported in the body or case 1 by the ledges or projections 20 which rest on the opposite side of said case, or by any other convenient means.

The arrangement of circuits in the instrument will depend entirely upon whether it is to be used as a voltmeter or an ammeter. If it is to be employed as a voltmeter, then the two movable coils and two fixed coils will be connected in direct series with the two binding-posts 21, 22. If it is to be used as an ammeter, the two fixed coils and two movable coils will be arranged in the two parts of the shunt likewise connected with the binding-posts 21, 22, and the relation and the size of conductor in the movable coils to that of the fixed coils will be such as to insure the passage of a known percentage of the current through the movable coils.

It will be apparent that the short shafts 7, 8 and 9 conjointly form a pivot shaft common to both of the movable coils; and it will also be obvious that when a current passes through the fixed coils and through the movable coils by reason of the reaction of the fields of force thus produced, the movable coils will set themselves in a new angular position and their extent of movement, which will be indicated by the needle moving over the scale, will have a relation to the difference of potential existing at the instrument terminals. So that the instrument may be used as an ammeter or as a voltmeter, as above stated. Obviously, the use of two two coils greatly increases the sensitiveness of the instrument, and the winding of the coils in opposite directions prevents the interference of terrestrial magnetism.

I claim:—

1. In an electrical measuring instrument, two stationary coils, two coils wound in opposite directions movable about an axis common to both and respectively located in the fields of said stationary coils, and a spring opposing and counterbalancing the impressed action of said movable coils.

2. In an electrical measuring instrument, two stationary coils, two coils wound in opposite directions having a common diametral pivot and vibrating respectively in the fields of said stationary coils, and a spring opposing and counterbalancing the impressed action of said movable coils.

3. In an electrical measuring instrument, two stationary coils, two coils wound in opposite directions supported on a pivot shaft common to both and located respectively in the fields of said stationary coils, and a spring connected to said pivot shaft and to an abutment and opposing the vibration of said shaft.

4. In an electrical measuring instrument, two stationary coils placed side by side, a shaft extending diametrally through both of said coils, two coils wound in opposite directions supported on said shaft and disposed within said fixed coils, and a spring connected to said shaft and to an abutment and opposing the vibration of said shaft.

5. In an electrical measuring instrument, two stationary coils, two coils wound in opposite directions supported on a pivot shaft common to both and located respectively in the fields of said stationary coils, and springs connected to said pivot shaft and to abutments and opposing the vibration of said shaft; the said coils and springs being inserted and the said springs being disposed respectively to lead the actuating current into and out of said movable coils.

6. The combination in an electrical measuring instrument of the fixed coils 2 and 3, the movable coils 5 and 5* wound in opposite directions and respectively disposed within said fixed coils, the pivot shaft 7 8 9 carrying said movable coils, and the springs 12 and 14 opposing the vibration of said shaft.

EDWARD WESTON.

Witnesses:
A. H. HOEFER,
R. O. HEINRICH.